United States Patent

[11] 3,563,489

| [72] | Inventor | Chester L. Coshow |
| | | 1113 Center, Collinsville, Okla. 74021 |
| [21] | Appl. No. | 822,463 |
| [22] | Filed | May 7, 1969 |
| [45] | Patented | Feb. 16, 1971 |

[54] DEPTH-GAUGING MEANS FOR FISHING REELS
8 Claims, 5 Drawing Figs.

[52] U.S. Cl. .................................................. 242/84.1,
242/84.2, 242/118.4
[51] Int. Cl. .................................................. A01k 89/00
[50] Field of Search ..................................... 242/84.1,
84.2, 84.21, 128, 104, 118.4

[56] References Cited
UNITED STATES PATENTS
| 3,085,765 | 4/1963 | Ulrich ........................ | 242/84.1 |
| 3,176,929 | 4/1965 | Britt .......................... | 242/84.1 |
| 3,465,982 | 9/1969 | Coshow ....................... | 242/84.2 |

*Primary Examiner*—Billy S. Taylor
*Attorney*—William S. Dorman

ABSTRACT: A fishing reel including metering means for paying-out predetermined lengths of line, comprising a rotatable reel having a peripheral surface upon which line can be wound, and a gauge member removably secured on the rotatable spool spaced from the peripheral surface thereof whereby the length of line subsequently payable from the spool when the gauge member is in position thereon is limited to those line windings supported by the gauge member. In addition, an open face type spinning reel comprising a normally stationary spool revolvable against a friction brake and including a gauge member removably secured on the spool in spaced relationship with the peripheral surface thereof whereby subsequent line payed from the spool will be limited to the line windings supported by the gauge member.

PATENTED FEB 16 1971　　　　　　　　　　3,563,489

CHESTER L. COSHOW
INVENTOR

BY

William S. Dorman
ATTORNEY

DEPTH-GAUGING MEANS FOR FISHING REELS

This invention relates to fishing reels, casting reels, spinning reels and the like and more particularly, but not by way of limitation to an improved gauge means for fishing reels for controlling the payout of predetermined lengths of line.

Whereas fishermen frequently find it desirable to fish at a certain depth, and do so repeatedly each time the hook is dropped in a particular location, conventional fishing reels, being incapable of conveniently and automatically being gauged for the specific depth required, have been found unsatisfactory. Further, anglers desiring to cast to predetermined distances and to repeatedly accomplish such measured casts have been frustrated to this end, especially when a readjustment of a previously gauged distance becomes necessary. A depth gauging means for spinning reels has been developed for overcoming this disadvantage, as shown in my copending U.S. Pat. No. 3,465,982 filed July 28, 1967, and entitled "Spinning Reel Depth-Gauging Means," and U.S. Pat. No. 3,503,570 filed Apr. 22, 1968, and entitled "Spinning Reel Depth Gauging Means." However, the problem is equally frustrating for the deep sea fishermen, who normally use relatively large reels commonly known as level wind reels wherein the spool member having a the line wound thereon rotates. There are also many fishermen who use reels known as open face fishing reels wherein the spool member is normally stationary, but may be rotated against a friction brake member under certain condition during use. These large deep sea reels and open face reels present an additional problem when it is desired to drop a hook repeatedly into the water at substantially the same depth.

The present invention contemplates an improved depth gauging means for fishing reels which is particularly designed and constructed for overcoming the above disadvantages. The novel gauge means comprises a shaft or rod member which may be readily selectively inserted in the spool member of an open face type fishing reel, or the large deep sea reels when it is desired to control the paying out of the line from the reel. In addition, the gauge member may be readily removed or repositioned on the spool member for altering the length of the line to be paid out, but subsequently retaining or controlling the payout at the same length until it is necessary or desirable to again alter the payout length of the line. The gauge member is spaced from the peripheral surface of the spool and extends substantially parallel with respect thereto whereby the subsequent line portion wound on the spool will pass over the gauge member in or that the hook, regardless of the number of times reeled in and redropped, will sink precisely to the originally gauged depth, readjustment of the setting or the absolute elimination of any setting being readily effectuated.

It is an important object of this invention to provide a novel depth gauging means for fishing reels which may be quickly and easily installed on substantially any fishing reel for controlling the length of line payout therefrom.

It is another object of this invention to provide a novel depth gauging means for fishing reels which may be quickly and easily installed on the spool of the reel whether the spool is stationary or revolvable.

Another object of this invention is to provide a novel depth gauging means for fishing reels which may be readily removed and replaced on the reel in order to alter the length of the line being gauged thereby.

Still another object of this invention is to provide a novel depth gauging means for fishing reels which is simple and efficient in operation and economical and durable in construction.

Other and further objects and advantageous features of the present invention will hereinafter more fully appear in connection with a detailed description of the drawing in which.

Figures 1, 2, 3, 4, 5:
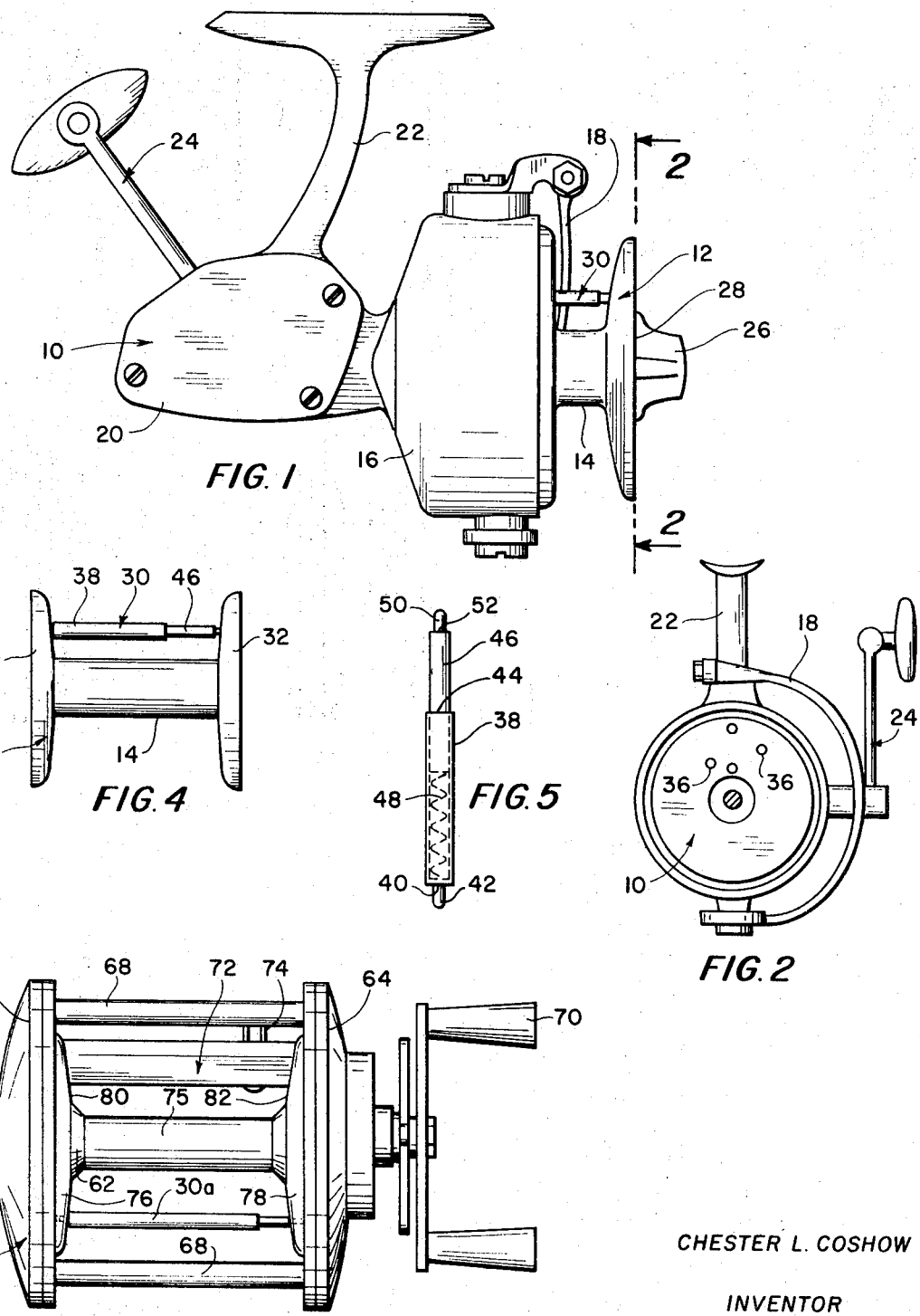
FIG. 1 is a side elevational view of an open face spinning reel having a depth gauge embodying the invention provided thereon.
FIG. 2 is an elevational view taken on line 2–2 of FIG. 1.
FIG. 3 is a side elevational view of a level wind fishing reel having a depth gauging means embodying the invention provided thereon.
FIG. 4 is a side elevational view of a spool for a fishing reel and having a depth gauging means embodying the invention provided thereon.
FIG. 5 is a side elevational view of a depth gauging means embodying the invention thereon.

Referring to the drawings in detail and particularly FIGS. 1 and 2, reference character 10 generally indicates an open face fishing reel of any suitable type. As depicted herein the reel 10 comprises a spool 12 having a peripheral surface 14 for receiving the usual line (not shown) thereon as is well known. A revolvable member 16 is provided adjacent the spool 14 and is provided with a line engaging level winding bail member 18 rotatable simultaneously therewith for a purpose as will be hereinafter set forth. The spool 12 and revolvable member 16 are suitable mounted on or secured to a housing or casing 20 which includes a mounting member 22 for securing the reel 10 to a fishing pole or the like (not shown). A suitable gear train or gear mechanism (not shown) is disposed within the housing 20 and is operably connected through a rotatable handle or crank member generally indicated at 24 for rotation thereby as is well known. The revolvable member 16 is operably connected with the gear mechanism whereby rotation of the handle 24 causes the rotatable member 16 and bail member 18 to rotate. The spool member 12 is operably connected with the gear mechanism for longitudinal reciprocation simultaneously with the rotation of the member 16. In addition, a suitable friction brake member 26 is threadedly or otherwise secured adjacent the outer or exposed surface or end 28 of the spool 12 for frictional engagement therewith whereby the normally nonrotatable spool 12 may be selectively rotated against the frictional force of the member 26 in a manner and for a purpose as will be hereinafter set forth.

In operation of the reel 10, the line (not shown) is suitably wound around the peripheral surface 14 of the spool 12 in the usual manner. Manual turning of the handle or crank 24 in one direction causes the line to wind onto the spool 26. Rotation of the member 16 in an opposite direction permits paying out or unwinding of the line from the spool 12, all as is well known. In the event that the line becomes taut for any reason, such as upon catching a fish or becoming entangled, the spool 12 will rotate from the pull force of the line when the force of the line exceeds the force of the friction brake member 26 against the end 28 of the spool.

When it is desired to pay out a predetermined or preselected length of line from the spool during each operation of the reel 10 a guage member generally indicated at 30 may be readily inserted in the spool 12 in such a manner as to be spaced from and substantially parallel to the peripheral surface 14. Subsequent to the installation of the gauge member 30 on the spool 12 upon rewinding of the line on the spool 12 the line will wind around a portion of the peripheral surface 14 and over the outer surface of the gauge 30 and all subsequent operations of paying out of the line will result in only that length of line so wound over the gauge 30 and peripheral surface 14. Thus, an identical length of line can be repeatedly payed out from the spool 12.

The spool member 12 is usually provided with oppositely disposed circumferential end flanges 32 and 34 which facilitate winding of the line on the peripheral sura surface 14 and substantially preclude accidental loss of the line from the spool. In order to provide for variable positions for the gauge 30 with respect to the peripheral surface 14 a plurality of radially spaced apertures 36 (FIG. 2) are provided on the inwardly directed surface of each flange 32 and 34 with respective pairs of the apertures 36 of the flanges 32 and 34 being disposed in substantially axial alignement. (Only the apertures 36 of the flange 32 are depicted as shown in FIG. 2.) The gauge member 30 may be readily installed or inserted between the particular selected aligned pairs of apertures 36 in a manner as will be hereinafter set forth in order to achieve the desired length of payout of the line.

The gauge 30 comprises an elongated shaft or sleeve member 38 of a length less than the distance between the end flanges 32 and 34. One end 40 of the sleeve 38 is closed and reduced finger member 42 extends axially outward therefrom, as particularly shown in FIG. 5. The opposite end 44 of the sleeve 38 is open for slidable receiving a reciprocal rod 46 therein. A helical spring 48 is disposed within the sleeve 38 and interposed between the closed end 40 thereof and the rod 46 for constantly urging the rod 46 in an axial direction away from the closed end 40. Of course, suitable means (not shown) is provided for cooperating between the rod 46 and sleeve 38 for precluding accidental separation of the rod 46 from the sleeve, such as a bayonet type connection, or complementary should means, or the like, as is well known. A reduced finger member 50 similar to the finger 42 is provided on the outer end 52 of the rod 46 and extends axially outward therefrom. The fingers 42 and 50 are of a size for insertion within a complementary pair of aligned bores 36 for facilitating installation of the gauge 30 within the spool 12.

The inwardly directed faces of the flanges 32 and 34 of the spool 12 are usually tapered outwardly, as shown in the drawings. Whereas the end 40 of the sleeve 38 and the end 52 of the rod 46 as depicted herein are substantially at right angles with respect to the axes of the respective sleeve and rod, it is to be noted that the ends 40 and 52 may be tapered complementary to the taper of the inner faces of the flanges. Thus, the installed gauge 30 will be of a snug fit between the flanges 32 and 34.

In order to install the gauge 30 in the spool 12, the gauge 30 may be manually grasped in any well known manner, and the finger 50 may be inserted in the desired or appropriate aperture 36 of one of the flanges such as the flange 32. The sleeve 38 may be moved longitudinally with respect to the rod 46 and against the force of the spring 48 through a sufficient distance whereby the finger 42 will clear the inwardly directed surface of the opposite flange 34, and the finger 42 may be inserted in the axially aligned aperture 36 thereof. The spring member 48 will urge the end portions 52 and 40 into secure engagement with the inwardly directed faces of the flanges 32 and 34, respectively, for retaining the gauge 30 in position therebetween until it is desired to alter the position thereof.

When it becomes necessary or desirable to alter the position of the gauge 30 for any reason, the gauge may be manually grasped in any known manner, and the sleeve 38 may be moved longitudinally with respect to the rod 46 and against the force of the spring 48 through a sufficient distance for removing the finger 42 from engagement with the aperture 36. This releases one end of the gauge 30 from connection with the spool 12, and the finger 40 may then be readily removed from the aperture 36. The gauge may then be reinstalled in the spool 12 by placing the fingers 42 and 50 in a second pair of aligned apertures 36 in the manner as hereinbefore set forth. Of course, if it is not required to use the gauge, the device may be temporarily removed from the spool 12 until such time as the use thereof is again required.

Referring now to FIG. 3, reference numeral 60 generally indicates a level wind fishing reel of any well-known type having the usual rotatable or revolvable spool 62 carried by or mounted between a pair of oppositely disposed end housing 64 and 66. The housings 64 and 66 are spaced apart in any well-known manner such as by a plurality of rods 68. A suitable gear train (not shown) is mounted or disposed within one end portion such as the end housing 66 and is operable connected (not shown) between the usual rotatable handle or crank 70 and the spool 62 whereby the manual rotation of the handle 70 causes the spool 62 to revolve about the longitudinal axis thereof. A suitable level wind mechanism generally indicated at 72 is usually provided for the reel 60 and is geared or otherwise connected between the spool 62 and handle 72 whereby a line guide member 74 is moved reciprocally between the end members 64 and 66 during revolutionary movement of the spool 62 for a purpose as will be hereinafter set forth. A fishing line (not shown) is normally wound or at least partially wound on the peripheral surface 75 of the spool 62 and the spool 62 is normally provided with oppositely disposed circumferential end flanges 76 and 78 for maintaining the wound line on the spool. The inwardly directed faces 80 and 82 of the flanges 76 and 78 respectively are usually slightly tapered as is clearly shown in FIG. 3. The line (not shown) is normally wound in the spool 62 in such a manner that revolving of the spool 62 in one direction causes the line to wind onto the spool and revolution in an opposite direction causes the line to unwind. Thus, when the handle 72 is manually rotated in one direction, the line is reeled onto the spool 62, and the line may be manually pulled from or unreeled from the spool 62 by applying pressure on the line which causes the spool 62 to revolve in an opposite direction as is well known. Of course, the handle 70 may be rotated in an opposite direction for unreeling of the line, if desired.

In the particular reel 60 depicted in FIG. 3 the line moving from or onto the spool 62 is engaged by the finger 74. The finger 74 moves longitudinally or reciprocally between the flanges 76 and 78 simultaneously with the rotation of the spool 62 and causes the line to wind or unwind evenly throughout the length of the spool 62 as is well known. Of course, it will be apparent that the level wind mechanism may be eliminated, if desired.

When a preselected length of line has been payed out from the reel 60 of or from the spool 62, and it is desired to repeat this same length of line for each subsequent line payout operation, a gauge member 30a may be installed in the reel 60 or on the spool 62 in the manner as hereinbefore set forth. The gauge member 30a is generally similar to the gauge member 30, with the length thereof being complementary to the length of the spool 76 whereby the gauge 30a will be installed between the end flanges 76 and 78 of the spool and disposed substantially parallel with the peripheral surface 75 of the spool 62. Of course, the inwardly directed faces of the end flanges 76 and 78 are each provided with a plurality of radially spaced apertures (not shown) similar to the apertures 36 whereby the gauge member 30a may be inserted between a selected pair of aligned apertures 36. As hereinbefore set forth, the wound onto the spool 62 subsequent to the installation of the gauge 30a thereon will wind around a portion of the peripheral surface 75 and over the gauge 30a and all subsequent line payouts will result in an a exact length of line. Of course, the position of the gauge with respect to the distance thereof from the peripheral surface 75 may be altered in the manner as hereinbefore set forth when it is desired to select a new or different length of the line to be out.

It is to be noted that there is a current trend in the fish line industry to provide reels or spools having the line spooled thereon, with the filled spool itself adapted for removable installation on a fishing reel. A gauge 30 may be provided for the prewound in the similar manner as herein set forth. A plurality of aligned apertures similar to the apertures 36 may be provided for the prewound spool, and a gauge member 30 may be inserted therein for use with the spool, as hereinbefore set forth. In addition, it is anticipated that a guage member may be permanently mounted on one flange of a spool, such as the spool 12, or the spool 62, or a prewound spool, with said permanently mounted gauge member being provided with a retractable and extensible rod member similar to the rod 46. The retractable rod member may be retained in a normal retracted position to preclude interference with the normal use of the reel, and when it is desired to provide a line guage as hereinbefore set forth, the retracted rod may be released whereby the rod member will extend across the spool for engagement with the opposite flange thereof. The extensible rod member may be spring urged and operable in a manner generally similar to the nib of the well known ball point pen, for example. The overall use and operation of the gauge will be substantially as set forth herein.

From the foregoing it will be apparent that the present invention provides a novel gauge means for controlling the payout of a line from a fishing reel, or the like, whereby substantially the exact length of the line may be cast from the reel at each subsequent casting operation. The novel gauging means comprises an elongated shaft member which a may be readily installed on the spool of a fishing reel by inserting thereof between a pair of axially aligned bores provided on the opposite flanges of the spool. With the gauge member installed on the spool, an established length of the line is provided for the subsequent casting operations. The novel gauge member may be readily removed from position on the spool, thus permitting normal use of the reel, and for repositioning thereof on the reel to alter the length of the line, as desired. The novel gauge may be utilized with substantially any type of fishing reel, whether the spool member is normally revolvable or normally stationary with respect to the normal operation thereof.

Whereas the present invention has been described in particular relation to the drawings attached hereto, it so should be understood that other and further modifications, apart from those shown or suggested herein, may be made within the spirit and scope of this invention.

I claim:

1. In combination with a fishing reel having a spool provided with a peripheral surface for the reeling and unreeling of a line, gauge means carried by the spool and comprising an elongated contractible and extensible shaft member spaced from and extending substantially parallel to the said peripheral surface, said contractible position for the shaft member providing a disengaged position with respect to the spool whereby the reel may be utilized in a normal manner, and said extensible position for the shaft member providing an engage position with respect to the spool for precluding further unreeling of the line and establishing a substantial constant length of the line for subsequent unreeling and reeling operations.

2. In combination with a fishing reel having a spool, gauge means as set forth in claim 1 wherein said spool is provided with means for cooperating with the shaft member to permit variable positioning of the shaft member with respect to said peripheral surface.

3. In combination with a fishing reel having a spool, gauge means as set forth in claim 1 wherein said shaft member comprises a substantially cylindrical sleeve member, a rod member slidably disposed within said sleeve and extending axially outward therefrom, yieldable means interposed between the sleeve and the rod member for constantly urging the rod member toward an axially extended position with respect to the sleeve for retaining the gauge member in position on the spool, said rod member being adapted for movement against the force of said yieldable means upon the application of pressure in one direction for being axially contracted with respect to the sleeve member to permit release of the gauge means for operative engagement with the spool.

4. In combination with a fishing reel having a spool, gauge means as set forth in claim 3 wherein said spool is provided with means for cooperating with the shaft member to permit variable positioning of the shaft member with respect to the said peripheral surface.

5. In combination with a fishing reel having a spool, gauge means as set forth in claim 4 wherein the cooperating means on said spool comprises a plurality of pairs of axially aligned apertures provided on the spool for selectively receiving the opposite ends of said shaft member therein, said aligned pairs of apertures being radially spaced from said peripheral surface to permit said variable positioning of the shaft member with respect to the said peripheral surface.

6. In combination with a fishing reel having a spool, gauge means as set forth in claim 1 wherein the shaft member comprises a sleeve member having one closed end and one open end, a rod member slidable disposed in the sleeve and extending axially outward from the open end thereof, spring means interposed between the rod and the closed end of the sleeve for constantly yieldably urging the rod axially outward from the sleeve first reduced finger means provided on the closed end of the sleeve and extending axially outward therefrom for removable engagement with the spool, and second reduced finger means provided on the outer end of the rod member for removable engagement with the spool to cooperate with the first finger means for removably securing the gauge means on the spool.

7. In combination with a fishing reel having a spool, gauge means as set forth in claim 6 wherein the spool is provided with means for cooperating with the first and second finger means to permit variable radial spacing of the shaft member with respect to said peripheral surface.

8. In combination with a fishing reel having a spool, gauge means as set forth in claim 7 wherein the cooperating means on said spool comprises a plurality of pairs of axially aligned apertures provided on the spool for selectively receiving the said finger means therein, said aligned pairs of apertures being radially spaced from said peripheral surface to permit said variable positioning of the shaft member with respect to the said peripheral surface.